US007945949B2

(12) United States Patent
Johnson (10) Patent No.: US 7,945,949 B2
(45) Date of Patent: May 17, 2011

(54) PROVIDING REMOTE SERVICES TO LEGACY APPLICATIONS

(75) Inventor: Bruce E. Johnson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 968 days.

(21) Appl. No.: 11/687,793

(22) Filed: Mar. 19, 2007

(65) Prior Publication Data

US 2008/0235782 A1 Sep. 25, 2008

(51) Int. Cl.
*G06F 21/00* (2006.01)
(52) U.S. Cl. ............................................. 726/5; 726/2
(58) Field of Classification Search .................... 726/2, 5
See application file for complete search history.

(56) References Cited

U.S. PATENT DOCUMENTS

| | | | |
|---|---|---|---|
| 5,452,459 A * | 9/1995 | Drury et al. ........................ | 1/1 |
| 5,706,427 A | 1/1998 | Tabuki | |
| 6,604,140 B1 | 8/2003 | Beck et al. | |
| 6,643,778 B1 | 11/2003 | Nakazawa | |
| 6,757,262 B1 | 6/2004 | Weisshaar et al. | |
| 6,957,427 B1 | 10/2005 | Wollrath et al. | |
| 7,003,782 B2 | 2/2006 | Baldwin et al. | |
| 2002/0032783 A1 | 3/2002 | Tuatini | |
| 2003/0046541 A1 | 3/2003 | Gerdes et al. | |
| 2004/0045004 A1 | 3/2004 | Cheenath | |
| 2004/0221017 A1 | 11/2004 | Yoon | |
| 2004/0230843 A1* | 11/2004 | Jansen ........................ | 713/202 |
| 2005/0125529 A1 | 6/2005 | Brockway et al. | |
| 2005/0125560 A1 | 6/2005 | Brockway et al. | |
| 2005/0193097 A1 | 9/2005 | Guthrie et al. | |
| 2005/0262016 A1* | 11/2005 | Hill et al. ....................... | 705/39 |
| 2005/0289648 A1 | 12/2005 | Grobman et al. | |
| 2006/0004764 A1 | 1/2006 | Kurhekar et al. | |
| 2007/0101148 A1* | 5/2007 | Schutz et al. ................. | 713/182 |
| 2007/0143836 A1* | 6/2007 | Bowers et al. .................. | 726/10 |

FOREIGN PATENT DOCUMENTS

EP 1031926 A1 8/2000

(Continued)

OTHER PUBLICATIONS

"Structure and Encapsulation in Distributed Systems: the Proxy Principle," by Marc Shapiro, May 1986, Proc. 6th Int. Conf. on Distributed Computing Systems, [online] [retrieved on Nov. 6, 2006], 13 pgs. Retrieved from the Internet: ftp://ftp.inria.fr/INRIA/regal/papers/1986/SEDSPP_icdcs86.pdf.

(Continued)

*Primary Examiner* — Nasser Moazzami
*Assistant Examiner* — Lisa Lewis
(74) *Attorney, Agent, or Firm* — Workman Nydegger (57) ABSTRACT

A developer can provide complex services to existing legacy applications using one or more components configured to tap into a service abstraction framework. In one implementation, for example, a developer of a remote service provider adds one or more authentication attributes to the remote service provider, and further creates a local client driver that incorporates a client proxy. When a legacy application generates a function request (e.g., to print, send a text message, initiate a voice communication), the client proxy intercepts the request through an appropriate communication subsystem, and relays the request to the server proxy. The server proxy determines the extent to which authentication measures may be required. If required, the client proxy can initiate out-of-band processing with various authentication managers to validate/process the request at the remote service provider.

20 Claims, 5 Drawing Sheets

FOREIGN PATENT DOCUMENTS

| KR | 10-2005-075117 | | 7/2005 |
|---|---|---|---|
| WO | WO2005074234 A1 | | 8/2005 |
| WO | WO2007052959 | * | 11/2006 |

OTHER PUBLICATIONS

"Evaluating Web Services Based Implementations of GridRPC," by Satoshi Shirasuna, Hidemoto Nakada, Satoshi Matsuoka and Satoshi Sekiguchi, 11th IEEE International Symposium on High Performance Distributed Computing HPDC-11 2002, [online] [retrieved on Nov. 6, 2006], 9 pgs. Retrieved from the Internet: http://ieeexplore.ieee.org/xpl/freeabs_all.jsp?arnumber=1029923.

"End-to-End WAN Service Availability," by Bharat Chandra, Mike Dahlin, Lei Gao, and Amol Nayate, University of Texas at Austin, Date Unknown, [online] [retrieved on Nov. 6, 2006], 12 pgs. Retrieved from the Internet: http://www.cs.utexas.edu/users/lasr/pub/pdf/Usits01.pdf.

"DCOM and CORBA Side by Side, Step by Step, and Layer by Layer," by P. Emerald Chung, Yennun, Huang, Shalini Yajnik, Deron Liang, Joanne C. Shih, Chung-Yih Wang, and Yi-Min Wang, Sep. 3, 1997, [online] [retrieved on Nov. 6, 2006], 25 pgs. Retrieved from the Internet: http://research.microsoft.com/~ymwang/papers/HTML/DCOMnCORBA/S.html.

* cited by examiner

PROVIDING REMOTE SERVICES TO LEGACY APPLICATIONS

CROSS-REFERENCE TO RELATED APPLICATIONS

N/A

BACKGROUND

Background and Relevant Art

As computerized systems have increased in popularity, so also have the popularity and number of application programs and hardware created to drive various functionality on the computerized systems. In general, application programs can range from the very complex, such as operating systems and database technology employing hundreds or thousands of individual application programs, to the very simple, such as application programs that output a single text line. Due at least in part to the variety of applications, as well as to the relatively rapid nature of software and hardware development, however, it is often the case that many pre-existing applications are unable to benefit from or use the newly developed technology without significant modifications. Such application programs, particularly those pre-existing applications that are unfamiliar with newer devices or interfaces, are often referred to as "legacy" applications.

One simple example of this is that many devices are now accessible primarily over a network connection, rather than as a traditional local peripheral device (e.g., otherwise connected via PCI, ISA, USB, SCSI, or SATA interfaces). As a result, legacy applications configured to access the local device as a peripheral attachment generally will need to be upgraded or modified to use the device over a network. For example, a word processing program might be configured to prepare and send image data to a printer registered with the resident operating system. To enable use of a network printer, however, the administrator might need to install a new printer driver on the computer system. Thus, the legacy application can prepare and send its image data as originally done, but that data is redirected to a network printer.

Providing network access to devices has opened up a broad spectrum of services previously unavailable. For example, many service providers now provide remote storage drives, which a computer system may be able to install as though the drive were locally-attached. Other service providers may provide remote printing services at remote locations, where a user may be allowed to print out papers to a local print store. In contrast with simply sharing a network device on a local area network, the service provider for these types of services will generally want to provide the devices under a charge, metering, authentication, and/or billing scheme. For example, a user may be required to pay a monthly fee to install a remote storage drive on the user's computer, or may be required to pay a per-page fee when printing to a remote printer.

One will appreciate that, in these types of situations, simply installing a new device on the user's computer does not necessarily enable the legacy application to access the desired authentication or billing scheme. Accordingly, many service providers will devise frameworks that bypass the traditional legacy application/driver communication model. For example, a service provider of a remote storage drive will create an application program that the user will need to install locally. The local application might be configured to periodically communicate with a remote service to ensure that the user's account is up-to-date before allowing the user to save data to the remote storage drive.

In other cases, the service provider might provide the user with access to the remote device only through a separate web interface. For example, a remote printing service might require a user to login to a particular web site, and then separately upload a document created using a legacy application program. If properly authenticated, the remote service provider could then print the document and send a confirmation through the web interface. In this sense, therefore, there is little or no involvement between the legacy application and the remote service provider.

One will appreciate, therefore, that present solutions for providing enhanced services to legacy applications tend to be fairly device or implementation specific, and fairly unique to each given service provider. One will also appreciate that, as such, a system administrator may be reluctant to install a new set of services and modules for a large number of different service providers or devices. Other problems include the problem that the use and function of these types of solutions are often less convenient than what would be expected through an ordinary legacy application. With respect to the remote printer example, a user might generally find it to be more convenient to print through the conventional legacy application's print dialog box, rather than going through one or more upload procedures through a web interface.

Accordingly, present solutions to providing legacy applications with enhanced services tend to be fairly inflexible and inconvenient. As more and more devices are network enabled, these difficulties could become exaggerated, especially with implementing these types of services and devices in large enterprises.

BRIEF SUMMARY

Implementations of the present invention include systems, methods, and computer program products configured to provide legacy application(s) with access to complex services and device schemes through a service abstraction framework. In one implementation, for example, a device driver is configured with a client proxy, which, in turn, is configured to initiate various out-of-band communications and transactions within a generalized service abstraction framework. The service abstraction framework, in turn, can be configured to handle any number of functions, such as quota, billing, or payment management, as well as other forms of authentication or credential issues for virtually any type of service provider. As such, legacy applications need only tap into the service abstraction framework to use a service provider, as well as to use functions and devices for which the legacy application may not have been otherwise configured.

For example, a method from the client perspective of executing one or more legacy application requests through a remote service provider can involve sending, via a client proxy, one or more application program requests directed to a remote service provider configured to handle the one or more requests. The method can also involve initiating, via communication between the client proxy and a higher level security layer, one or more local authentication managers. In general, the client proxy and the one or more local authentication managers operate in different sessions. In addition, the method can involve establishing a communication channel between the client proxy and the one or more local authentication managers. Furthermore, the method can involve receiving from the remote service provider one or more indicators that the one or more application program requests have been accepted.

By contrast, a method from the server perspective of processing one or more device requests using a service abstraction framework can involve receiving from a client computer system, via a server proxy, one or more device requests to be processed by a remote service provider. The method can also involve identifying from one or more attributes associated with the remote service provider that one or more authentication measures are required to process the one or more device requests. In addition, the method can involve sending one or more authentication requests to a remote authentication manager. In general, the remote authentication manager will be in communication with a local authentication manager at the client computer system. Furthermore, the method can involve sending one or more responses to the client computer system that the one or more requests have been accepted.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Implementations of the present invention extend to systems, methods, and computer program products configured to provide legacy application(s) with access to complex services and device schemes through a service abstraction framework. In one implementation, for example, a device driver is configured with a client proxy, which, in turn, is configured to initiate various out-of-band communications and transactions within a generalized service abstraction framework. The service abstraction framework, in turn, can be configured to handle any number of functions, such as quota, billing, or payment management, as well as other forms of authentication or credential issues for virtually any type of service provider. As such, legacy applications need only tap into the service abstraction framework to use a service provider, as well as to use functions and devices for which the legacy application may not have been otherwise configured.

In general, the service abstraction framework can comprise any number of components, modules, and/or agents to provide legacy applications with remote services. In at least one implementation, for example, the service abstraction framework comprises one or more client and server-side proxies configured to perform or otherwise initiate out-of-band communication and/or processing in conjunction with a corresponding client or server-side driver. To this end, the service abstraction framework further comprises one or more authentication managers for purposes of authentication, identity management, and payment for services.

As will be understood more fully herein, these components will generally operate to separate access control and data flow from a given service provider. This can enhance security and efficiency, and can allow remote devices to function essentially as service providers themselves. Accordingly, reference herein to services or service providers will also be understood to include reference to remote devices used within the service abstraction framework. That is, a remote device can also be thought of as a remote service.

Figure 1:
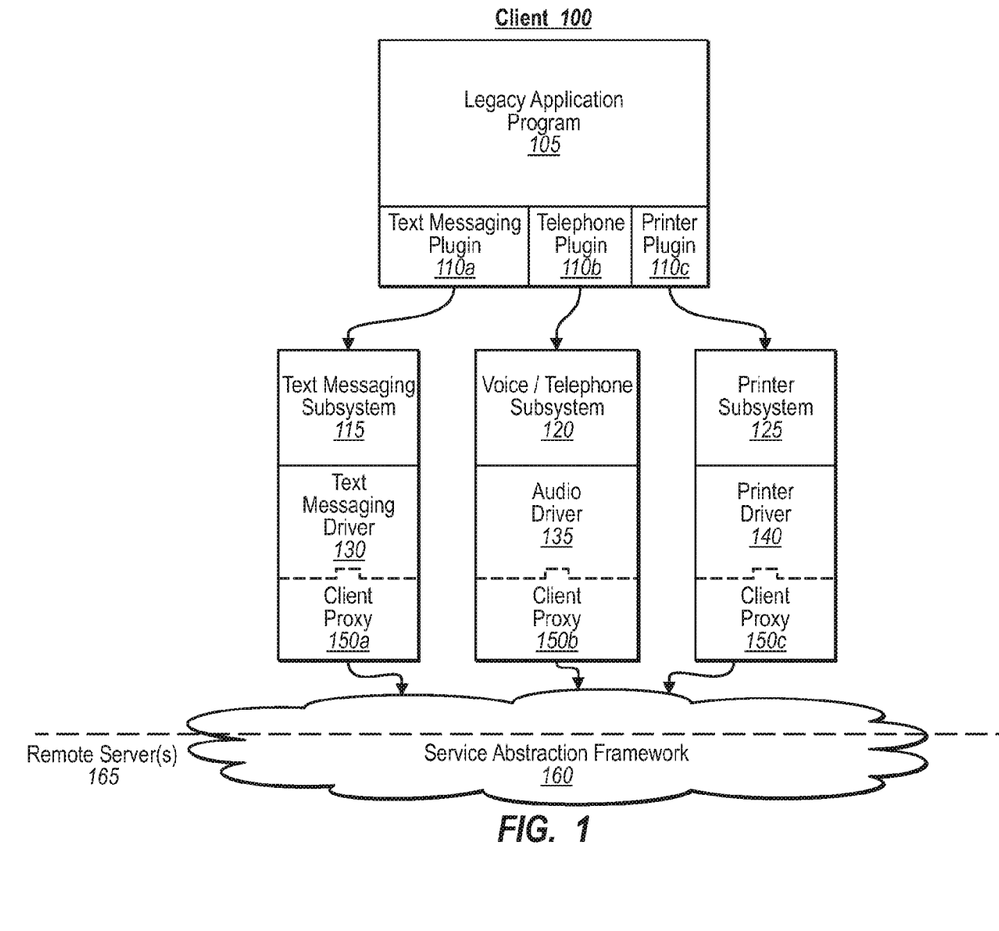
FIG. 1 illustrates an overview architectural schematic diagram in accordance with an implementation of the present invention in which a legacy application program communicates with a service abstraction framework.

Referring now to the Figures, FIG. 1 illustrates an overview schematic diagram in which a legacy application, such as an email program, a word processing program, a database program, or the like, taps into the service abstraction framework 160 (e.g., to use a remote service provider). As previously mentioned, the prefacing term "legacy" will be understood to mean a conventional, or previously existing application, driver, and/or API built on existing or pre-existing technology. Specifically, a legacy application is any application that has not been specifically designed to participate or use the service abstraction framework, and may thus only be aware of local computing resources. A legacy application might be designed to use a disk drive for file storage, a local printer for printing, and a local modem for dialing phone numbers, or a local CDROM for accessing audio content. As such, a legacy application may also be coupled with any number of components for communicating with local subsystems, drivers, APIs, routers, or the like.

Accordingly, FIG. 1 shows that legacy application program 105 can include one or more application plug-ins, such as text messaging plug-in 110a, telephone (or otherwise audio) plug-in 110b, and printer plug-in 110c. Each of these plug-ins, in turn, is at least configured to communicate with various local subsystems for accessing particular devices. For example, FIG. 1 shows that text messaging plug-in 110a communicates with text messaging subsystem 115. Similarly, telephone plug-in 110b communicates with voice telephone subsystem 120, and printer plug-in 110c communicates with printer subsystem 125.

As will be understood herein, these components and subsystems provide legacy application 105 with various enhanced services through certain devices. As such, FIG. 1 shows that each of these subsystems 115, 120, and 125, etc. can be configured to communicate with a corresponding device driver 130, 135, and 140. In general, each of these drivers 130, 135, and 140 will have similar features and/or interfaces that will be expected by legacy application program 105. The device drivers, however, will also be modified or updated to include (or otherwise be coupled to) a client proxy.

In particular, FIG. 1 shows that each of these drivers 130, 135, and 140 are coupled to include (e.g., incorporate or reference) one or more client proxies, which help the driver communicate with the service abstraction framework 160. As will be understood more fully herein, the client proxy generally comprises binary code configured to interface with the corresponding device driver on one end, and tap into the service abstraction framework 160 on another end. In particular, the client proxy, or "proxy stub," is configured to expose the core functional elements of a device or resource API (e.g., send message, print file, play audio stream). As such, FIG. 1 shows that text messaging driver 130 includes or is coupled with client proxy 150a. Similarly, audio driver 135 includes or is coupled with client proxy 150b, and printer driver 140 includes or is coupled with client proxy 150c.

In one implementation, a developer can modify or update a device driver by including a reference within provided client proxy code to a particular remote service provider. For example, a developer working within a MICROSOFT operating environment can use VS.NET to add one or more references in the client proxy code to a particular remote service provider. Of course, reference herein to MICROSOFT environments or components is exemplary of only one implementation of the present invention. In particular, the components and functions described herein can be applied and practiced in any number of different operating environments.

In any event, a developer can then use VS.NET to compile the client proxy from, for example, Web Services Description Language ("WSDL.") During compilation, VS.NET would identify (e.g., from metadata in the WSDL code) that extra calls may be needed to one or more authentication managers to ensure payment is authorized. The compiled client proxy can then be coupled to the device driver, and hosted through the ordinary legacy application/subsystem/driver communication model. The legacy application program (e.g., 105) can then access a particular remote service provider, which may even invoke various billing procedures not otherwise provided or accessible through the legacy application program. One will appreciate that a developer can use this same type of model to provide other types of services not otherwise provided through a legacy application program.

For example, FIG. 1 shows that legacy application 105 can be used with audio driver 135 and client proxy 150b to communicate with a particular VOIP ("Voice Over Internet Protocol") service provider. In addition, legacy application 105 could use printer driver 140 and client proxy 150c to send print jobs to a remote printer, just as though the remote printer were a locally-attached device. As will be understood more fully herein, legacy application 105 could be metered and/or otherwise billed for using these remote services without ever receiving any sort of prompt or indication of the same.

Figure 2:
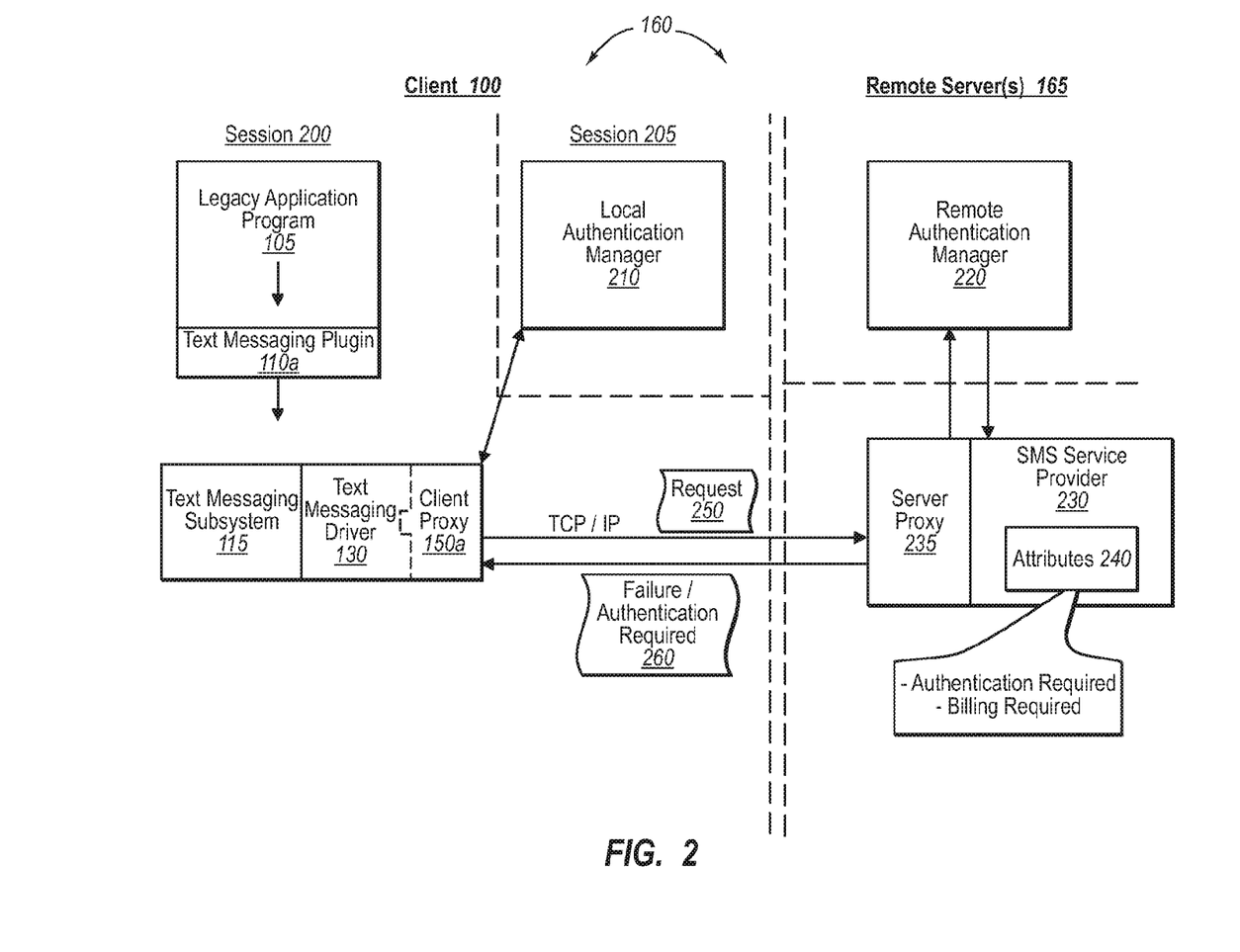
FIG. 2 illustrates an overview architectural schematic diagram in accordance with an implementation of the present invention in which one or more authentication managers are initiated to help facilitate processing of one or more legacy application requests through a remote service provider within the service abstraction framework.

FIG. 2 illustrates a generalized overview architectural schematic diagram in which client driver 130 and corresponding client proxy 150a are used to access a particular remote service provider through service abstraction framework 160. In particular, FIG. 2 illustrates an example, in which a legacy application 105 implements text messaging functionality through service abstraction framework 160. For example, legacy application 105 is an email or word processing program, and is used as an instant messaging endpoint to communicate with another endpoint (e.g., user's instant messaging interface at another computer system) of an instant messaging service.

Accordingly, FIG. 2 shows that legacy application program 105 can send one or more requests (e.g., one or more messages to be sent to a user) through text messaging plug-in 110a. For example, a user may open an email message interface through legacy application 105, enter a user name (and potentially a service provider name), as well as a message to be sent. Upon selecting a "send" function, legacy application 105 can then compose and pass the entered message to text messaging plugin 110a. Text messaging plugin 110a can then send the message in the form of one or more requests to text messaging subsystem 115, which in turn passes the requests/messages to text messaging driver 130.

FIG. 2 further shows that text messaging driver 130 can use client proxy 150a to send the message to an appropriate remote service provider. As previously described, the client proxy was previously compiled with a reference to the remote service provider. In the illustrated example, therefore, FIG. 2 shows that client proxy 150a prepares and sends request 250 using TCP/IP mechanisms to SMS ("Simple Message Service") service provider 230, which is an instant messaging service provider. For example, client proxy 150a identifies a service provider named in an address field of the original message, then prepares message 250 to be sent to a corresponding network server (e.g., remote server(s) 165) associated with service provider 230.

In general, the addressed service provider (e.g., 230) will receive message 250 via a server side proxy 235. The server-side proxy is similar to a client-side proxy (e.g., 150a), in that it is binary code configured to operate within the service abstraction framework 160. In one implementation, for example, server side proxy 235 is configured to identify a set of network protocols and metadata that have been added to existing (or newly developed) remote service providers.

In one implementation, for example, a developer of a service provider could add metadata to a service provider manually, or add the metadata using a wizard prior to compile time. When the service provider is compiled and run, the overall runtime will invoke the server side proxy, which executes and enforces the stated policy (e.g., payment, authentication). Since the server side proxy executes and enforces the stated policy, the remote service provider would only need to receive confirmation that the attributes have been satisfied (e.g., payment has been accepted). For example, FIG. 2 shows that the server side proxy 235 can identify from one or more attributes 240 included with remote service provider 230 that service provider 230 requires authentication and/or billing confirmations.

As shown in FIG. 2, therefore, server proxy 235 identifies no such authentication and/or billing information for the request, and thus sends a failure response 260 back to client 100. In at least one implementation, failure response 260 includes information that authentication or billing information is required to complete the request. In other cases, however, failure response 260 simply indicates that the request was forbidden or denied. In either case, the user initiating the request and/or the legacy application program 105 will generally be unaware that there has been any sort of communication failure or denial. This is at least in part because client proxy 150a can be configured to handle or initiate satisfaction of the service provider requirements (e.g., authentication, billing, etc.) through various out-of-process or out-of-band communications and processing.

One will appreciate that this out-of-band authentication/processing can take many forms, and is not limited specifically to user authentication, as such. For example, the "out of band" negotiation described herein can also include a request of a license key to (or from) one of the one or more authentication managers. From the client perspective, this can be used to ensure that clients (e.g., 100) are communicating with known and trusted service providers. From a service provider perspective, this can also ensure that the services and components are being delivered to a legitimate endpoint. For example, a video-on-demand service provider could use a license key confirmation to ensure that only one legitimate (i.e., non-pirated) hardware/software client application programs were receiving a given video stream. The service abstraction framework 160 could thus be used to provide a level of security that is similar to conventional cable and satellite set-top-box/smartcard technology.

Figure 3A:
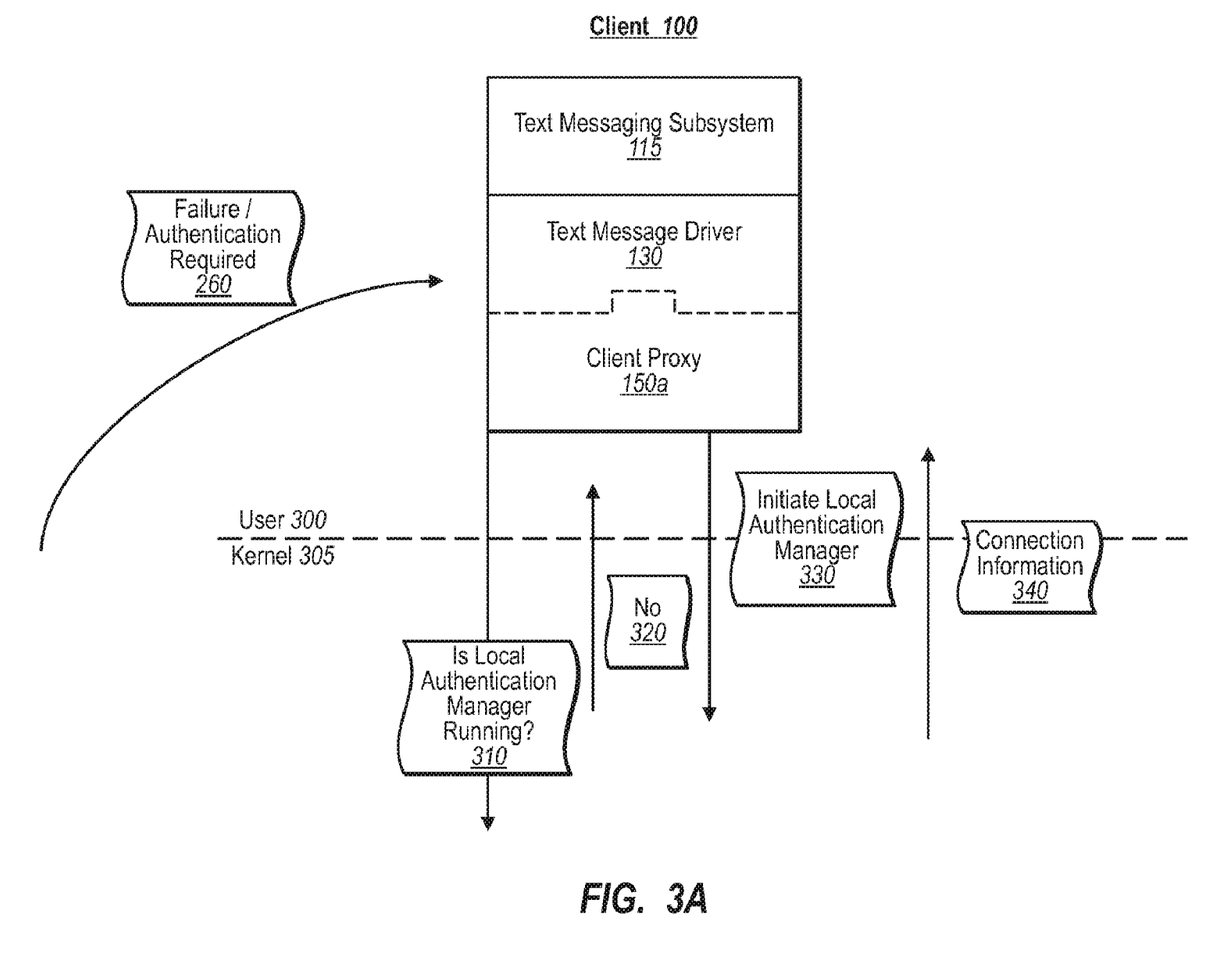
FIG. 3A illustrates a schematic diagram in accordance with an implementation of the present invention in which a client driver uses a client proxy to initiate a local authentication manager.

In any event, when receiving one or more failure response messages 260, client proxy 150 can then initiate a number of different out-of-band processes. As shown in FIG. 3A, for example, upon receiving failure message 260, client proxy 150*a* can send one or more communications to identify if an authentication manager is running. In general, this will involve client proxy 150*a* sending one or more communications to one or more high-trust components, such as one or more components operating in the kernel layer 305. Accordingly, FIG. 3A shows that client proxy 150*a* sends message 310 to determine if local authentication manager 210 is running.

In this particular example, FIG. 3A shows that the kernel layer 305 (i.e., one or more components operating in this layer) responds with a message 320, indicating that a local authentication manager has not been initiated. If the local authentication manager has been initiated, client proxy can then request connection information to communicate with the authentication manager to complete the transaction. In the illustrated example, client proxy 150*a* identifies from message 320 that the local authentication manager has not been initiated, and so sends message 330 to initiate the local authentication manager.

In response, therefore, FIG. 3A shows that kernel layer 305 responds with a connection message 340, which includes connection information 340. In at least one implementation, connection information 340 includes one or more handles or tokens that can be used by client proxy 150*a* to communicate with another component in another session. For example, connection information 340 can include one or more handles, as well as session information, for initiating a named pipe or RPC ("Remote Procedure Call") mechanism with a different component operating in a different session. This is generally necessary since the local authentication manager will be operating in a different session (e.g., 205) than the client proxy (e.g., 200).

Figure 3B:
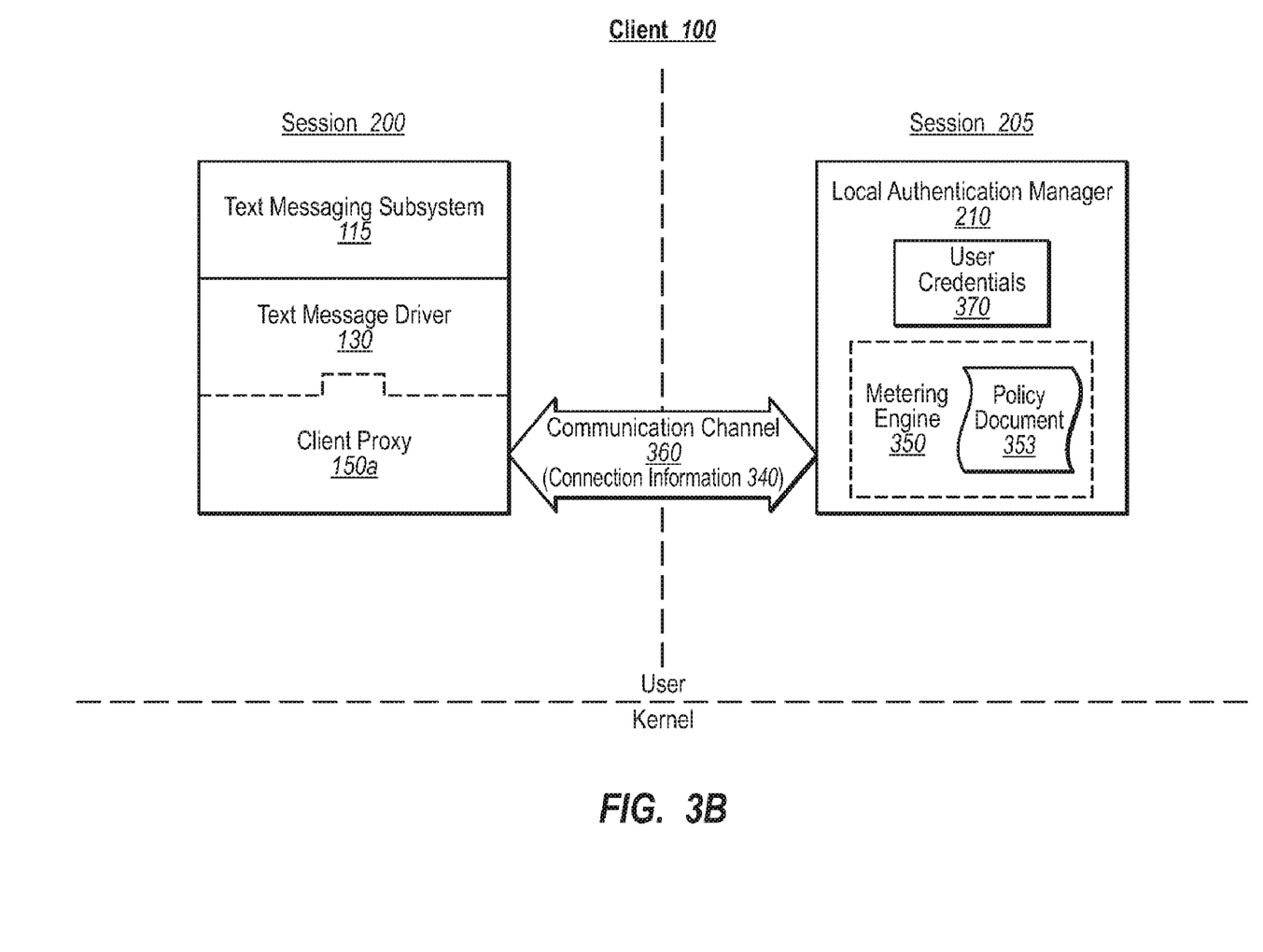
FIG. 3B illustrates a schematic diagram in accordance with an implementation of the present invention in which the client driver communicates with the local authentication manager through a client proxy.

For example FIG. 3B (also FIG. 2) shows that client proxy 150*a* establishes communication channel 360 using connection information 340. For example, client proxy 150*a* uses connection information 340 to establish a named pipe, RPC connection, or the like with local authentication manager 210. Having established the channel, client proxy 150 might then communicate the context of failure message 260 with authentication manager 210.

In response, local authentication manager 210 can use communication channel 360 to properly authenticate the user per the requested remote service (e.g., 230). For example, local authentication manager 210 can initiate one or more user interfaces to request an employee identification number, user name and password, a billing number, and/or credit card payment information. In particular, local authentication manager 210 can open one or more interfaces to request the authentication or credential information from one or more security components (not shown) at client 100.

In one implementation, local authentication manager 210 opens or prompts one or more user interfaces through the user's personal computer system (e.g., desktop or laptop system), and requests credentials (e.g., user name and password information, PIN, etc.) In another implementation, however, the local authentication manager 210 may prompt or otherwise open up one or more user interfaces through a separate device, rather than the user's personal computer.

For example, local authentication manager 210 might send instructions to the user's mobile phone, or other form of personal digital assistant ("PDA") through a BLUETOOTH, NEAR FIELD COMMUNICATION, or some other form of wireless or wired communication means. The instructions, when executed by the mobile phone or other form of PDA might then initiate a separate or remote authentication manager context on the given device, which, in turn, prompts the user for credentials (e.g., username and password, PIN, etc.) One will appreciate that requesting credentials through a separate device can an additional layer of security to the overall service abstraction framework 160.

However entered by (or received from, the user), the local authentication manager 210 (and/or remote authentication manager 220) can also use any such credential information in conjunction with any number of metering functions. In particular, any of the local or remote authentication managers can further include a metering engine 350, which can be used to enforce software runtime policy. In at least one implementation, for example, metering engine 350 can be configured to allow either the legacy application 105 or service provider developer to enforce different usage models (e.g., business models) based on a declarative policy document 353.

For example, one implementation of a policy document 353 can include an XrML document with custom schemas. The custom schemas can be written to define the use or license of the legacy application 105 and/or the remote service provider 230. The metering engine 350 can also be used in conjunction with the above-mentioned billing or payment schemes to enforce a pay once (e.g., perpetual license), or to enforce a pay-as-you go license bound to a user's identity.

One will appreciate that such a metering engine 350 can offer service provider developers the possibility to significantly reduce the overhead in both product development and product life cycle maintenance. For example, a remote service provider 230 can be marked as "owned" by a third party, but licensed for use on client 100. In addition, since the metering engine 350 can enforce different local use policy for different users, service provider developers can produce a single binary application that provides varying levels of functionality to customers.

For example, some software is sold in different forms, such as a home user level or a professional level form of essentially the same software with different use policies. Typically, a software developer will differentiate these different forms using separate product identifiers (e.g., Stock Keeping Units, or "SKUs"), as well as separate physical distribution media. Using the metering engine 350 (and a properly instrumented application), key features (e.g., domain level participation) of a given product can be controlled through business policy (i.e. customer offering's) rather than through physically different media. By building a robust mechanism for the metering engine 350 deep within the service abstraction framework, application features can be purchased and controlled through dynamic policy.

In any case, and upon receiving or identifying the appropriate information, local authentication manager 210 can create one or more corresponding tokens. Local authentication manager 210 can then communicate the credentials and/or tokens with other appropriate components or modules within the service abstraction framework 160. As shown again in FIG. 2, for example, authentication manager 220 can communicate the relevant authentication and/or billing information for the user to remote authentication manager 220, which then communicates this information to remote service provider 230. Remote service provider 230 can then identify that (or if) the initial request 250 is allowable. In some cases, remote service provider 230 can also send one or more additional messages (not shown) to client proxy 150a that the initial request 250 has been accepted, and/or is being processed.

Accordingly, FIGS. 1-3B illustrate a number of components and modules that can be used within a service abstraction framework to provide a legacy application program 105 with one or more enhanced services, such as one or more remote services not otherwise available to (or possible with) the legacy application program. In particular, FIGS. 1-3B illustrate how an existing device driver can be modified to include client proxy code, which in turn provides a legacy application program with access to one or more services or components of a service abstraction framework. That is, any client proxy in accordance with an implementation of the present invention can be configured to initiate remote network communication, as well as inter-process or inter-session communications with other components. This further allows the client proxy to initiate various authentication measures that can be handled via out-of-band communication and/or processing.

Thus a legacy application (e.g., 105) can call, for example, a print API for a printer "device," which is actually a commercial network printing service. When this legacy application is run on an end-user's system, the service abstraction framework 160 can be invoked through the designated printer driver (which includes the client proxy, e.g., 150c). Next, when the legacy application calls the normal device driver API, (e.g., "print( )"), the server proxy code, unbeknownst to the application, calls out the service abstraction framework 160 to request a payment. This can invoke a set of additional behavior, such as requesting secure identity, payment, etc. through one or more authentication managers. If this procedure is successful, the service abstraction framework can return and transparently attach a payment security token to an object associated with the request, such that any future calls to the given service provider are authorized as payment provided.

Figure 4:
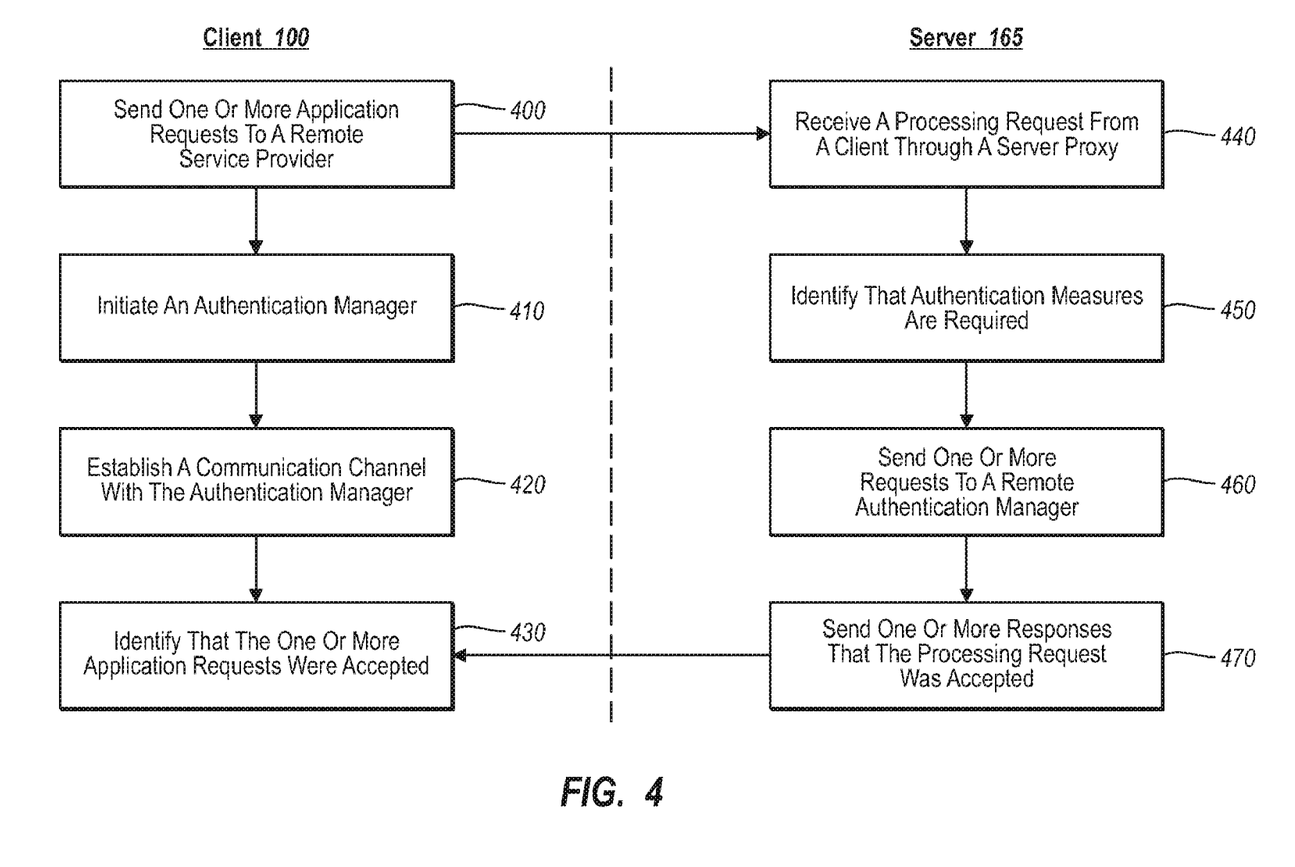
FIG. 4 illustrates flowcharts of one or more acts in methods from the perspective of a client and a server for processing one or more legacy application requests through a remote service provider.

One will appreciate that implementations of the present invention can also be described in terms of methods comprising one or more acts for accomplishing a particular result. In particular, FIG. 4 illustrates flow charts from the perspective of client 100 and server(s) 165 for providing one or more remote service functions to a legacy application using a delegated abstraction framework. The methods of FIG. 4 are discussed below with respect to the components, modules, and diagrams of FIGS. 1-3B.

For example, a method from the perspective of client computer system 100 of executing one or more legacy application requests through one or more remote services using a service abstraction framework can comprise an act 400 of sending one or more application requests to a remote service provider.

Act 400 includes sending one or more application program requests directed to a device to a remote service provider configured to handle the one or more requests. For example, as shown in FIG. 2, legacy application program 105 sends one or more requests, such as a text message request, to text messaging subsystem 115, and ultimately to text messaging driver 130. Client proxy 150a knows to handle this request using a remote service provider 230, and thus directs the request onward.

FIG. 4 also shows that a method from the perspective of client 100 can comprise an act 410 of initiating an authentication manager. Act 410 includes initiating, via communication between the client proxy and the higher level security layer, one or more local authentication managers, wherein the client proxy and the one or more local authentication managers operate in different sessions. As shown in FIG. 3A, for example, client proxy 150a communicates with the kernel layer 305 to determine whether an authentication manager is running. As shown in FIGS. 3A-3B, client proxy 150a can establish local authentication manager 210 (if not already initiated) for purposes of establishing authentication (e.g., user verification, and/or billing, etc.) The local authentication manager can then prompt the user for credential information, such as via one or more local user interfaces, or via one or more user interfaces prompted through a separate device.

In addition, FIG. 4 shows that the method from the perspective of client computer system 100 can comprise an act 420 of establishing a communication channel with the authentication manager. Act 420 includes establishing a communication channel between the client proxy and the one or more local authentication managers. For example, FIG. 3B shows that client proxy 150a can establish communication channel 360 using connection information 340 received from the kernel layer 305. Communication channel 360 (e.g., a named pipe or RPC mechanism) allows client proxy 150a to communicate with another component (e.g., local authentication manager 210) operating in a different session or process.

Furthermore, the method from the perspective of client computer system 100 can comprise an act 430 of identifying that the one or more application requests were accepted. Act 430 includes receiving from the remote service provider one or more indicators that the one or more application program requests have been accepted. For example, remote service provider 230 can send one or more additional response messages (not shown) back to client proxy 150a, where the additional response messages indicate that the initial request 250 has been accepted by SMS service provider 230, and/or is being processed.

In contrast, the method from the perspective of remote server 165 for processing one or more device requests using a delegated authentication system can comprise an act 440 of receiving a processing request through a server proxy. Act 440 includes receiving from a client computer system, via a server proxy, one or more device requests to be processed by a remote service provider. For example, as shown in FIG. 2, SMS service provider 230 receives request 250 through server proxy 235.

FIG. 4 also shows that the method from the perspective of server 165 can comprise an act 450 of identifying that authentication measures are required. Act 450 includes identifying from one or more attributes associated with the remote service provider that one or more authentication measures are required to process the one or more device requests. For example, at run time, remote service provider 230 identifies from attributes 240 that authorization is required and/or that billing is required for request 250. In particular, remote service provider 230 might require validation of a user name and password set of credentials, and/or authenticated billing information to process a particular request, which information can be identified in the set of attributes 240.

In addition, FIG. 4 shows that the method from the perspective of server 165 can comprise an act 460 of sending one or more requests to a remote authentication manager. Act 460 includes sending one or more authentication requests to a remote authentication manager, the remote authentication manager being in communication with a local authentication manager at the client computer system. For example, as shown in FIG. 2, remote service provider 230 is in communication with remote authentication manager 220, which in turn is in communication with the local authentication manager 210 initiated by client proxy 150a. Once local authentication manager 210 processes the user's authentication (e.g., and/or billing information), this information will be transmitted to the remote authentication manager 220, which in turn provides this information to remote service provider 230.

Furthermore, FIG. 4 shows that the method from the perspective of server 165 can comprise an act 470 of sending one or more responses that the processing request was accepted. Act 470 includes sending one or more responses to the client computer system that the one or more requests have been accepted. For example, remote service provider 230, as previously mentioned, sends one or more messages back to client proxy 150a that the initial request 250 has been accepted and/or is being processed.

For future requests from client 100, the service provider can simply use the existing authentication information until some timeout of validity, or until receiving some indication that the credentials are no longer valid. In some cases, service provider 230 can maintain one or more counters for each request received from client 100. The service provider 230 can then send a report of the counters to the remote and/or local authentication managers so that the incremental counts can be applied as charges to a billing entity. In other cases, service provider 230 might can require a new set of authentication for each request coming from client 100, and each time a function is processed, service provider 230 can send an indication of the same to the remote authentication manager.

Accordingly, FIGS. 1-4 and the corresponding text provide a number of schematics, components, and mechanisms for allowing legacy applications to tap into a generic service abstraction framework with little or no modification to the legacy application(s). Furthermore, these Figures and corresponding text provide at least one way in which one or more billing or authentication measures can be initiated or handled through a client proxy that is incorporated with a conventional device driver. Still further, the Figures and corresponding text provide one or more means or ways by which a client proxy can initiate or access complex device schemes through out-of-band communication and processing.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. At a client computer device in a computerized environment including one or more legacy applications in communication with one or more service provider subsystems and one or more device drivers, a method of executing one or more legacy application requests through one or more remote services using a service abstraction framework, comprising the acts of:
   sending one or more application program requests, wherein the one or more application program requests are directed to a service provider remote from the client computer device, the remote service provider being configured to handle the one or more requests;
   initiating, via communication between a client proxy and a higher level security layer, one or more local authentication managers, wherein the client proxy and the one or more local authentication managers are on the client computer device and operate in different sessions, and wherein the client proxy is hosted through a legacy application program on the client computer device, the legacy application program being limited to awareness of only local computing resources on the client computer device;
   establishing a communication channel between the client proxy and the one or more local authentication managers; and
   receiving from the remote service provider one or more indicators that the one or more application program requests have been accepted.

2. The method as recited in claim 1, further comprising an act of receiving one or more failure messages from the remote service provider with respect to the one or more requests.

3. The method as recited in claim 2, wherein the act of initiating occurs after an act of receiving the one or more failure messages from the remote service provider.

4. The method as recited in claim 1, wherein the higher level security layer is a kernel mode layer.

5. The method as recited in claim 4, wherein the act of initiating the one or more local authentication managers comprise an act of sending one or more requests to a kernel layer component to identify if any of the one or more local authentication managers is running.

6. The method as recited in claim 5, further comprising an act of, upon receiving one or more indications that the one or more local authentication managers is not running, sending one or more requests to initiate the one or more local authentication managers.

7. The method as recited in claim 6, further comprising an act of receiving connection information from the kernel layer component, wherein the connection information comprises a handle.

8. The method as recited in claim 7, wherein the act of establishing the communication channel further can comprise an act of initiating an RPC connection with the initiated one or more local authentication managers using the received handle.

9. The method as recited in claim 1, wherein the local authentication managers further include one or more metering engines configured to process the one or more requests in light of a policy document dictating a usage policy for the service provider.

10. The method as recited in claim 1, further comprising an act of the one or more local authentication managers identifying authentication information for the one or more requests.

11. The method as recited in claim 10, wherein the authentication information comprises a product license key for the legacy application program or for the remote service provider.

12. The method as recited in claim 10, further comprising an act of passing the identified authentication information to a remote authentication manager associated with the remote service provider.

13. The method as recited in claim 10, wherein the act of identifying authentication information includes an act of the local authentication manager generating one or more prompts through a separate device for authentication information.

14. The method as recited in claim 13, wherein the one or more prompts include a user interface requesting billing information.

15. At a server in a computerized environment having one or more server proxies for receiving requests from one or more client computer devices, a method of processing one or more device requests using a service abstraction framework, comprising the acts of:
receiving from a client computer device via a server proxy one or more device requests to be processed by a service provider, one or more device requests being received at a server remote from a client computer system, and wherein the server proxy and the service provider are remote relative to the client computer device;
identifying from one or more attributes associated with the remote service provider that one or more authentication measures are required to process the one or more device requests;
sending one or more authentication requests to an authentication manager that is remote relative to the client computer device, the remote authentication manager being in communication with an authentication manager on the client computer device, wherein the client proxy is hosted through a legacy application program on the client computer device, the legacy application program being limited to awareness of only local computing resources on the client computer device; and
sending one or more responses to the client computer device that the one or more requests have been accepted.

16. The method as recited in claim 15, wherein the one or more authentication measures include one or more requirements for billing information in order to process the one or more device requests.

17. The method as recited in claim 15, further comprising the acts of:
identifying that there is no authentication present for the one or more device requests; and
sending one or more failure messages to the client computer device.

18. The method as recited in claim 17, further comprising an act of receiving the authentication for the one or more device requests from the remote authentication manager.

19. At a client computer device in a computerized environment including one or more legacy applications in communication with one or more service provider subsystems and one or more device drivers, a computer program storage device having computer-executable instructions stored thereon that, when executed, cause one or more processors at the client computer device to perform a method comprising the acts of:
sending one or more application program requests, wherein the one or more application program requests are directed to a service provider remote from the client computer device, the remote service provider being configured to handle the one or more requests;
initiating, via communication between a client proxy and a higher level security layer, one or more local authentication managers, wherein the client proxy and the one or more local authentication managers are on the client computer device and operate in different sessions, and wherein the client proxy is hosted through a legacy application program on the client computer device, the legacy application program being limited to awareness of only local computing resources on the client computer device;
establishing a communication channel between the client proxy and the one or more local authentication managers; and
receiving from the remote service provider one or more indicators that the one or more application program requests have been accepted.

20. The computer program storage device recited in claim 19, wherein:
the client proxy is configured to initiate various out-of-band communications and transactions within a generalized service abstraction framework;
the legacy application program accesses the service abstraction framework only for use of the service provider; and
the client proxy interfaces with a device driver on one end, and the service abstraction framework on the other, the client proxy being configured to expose core functional elements of a device.

* * * * *